Dec. 23, 1969   A. F. KUTAS ET AL   3,485,142
LINER SEAL FOR DIESEL ENGINES AND THE LIKE
Filed Jan. 25, 1967
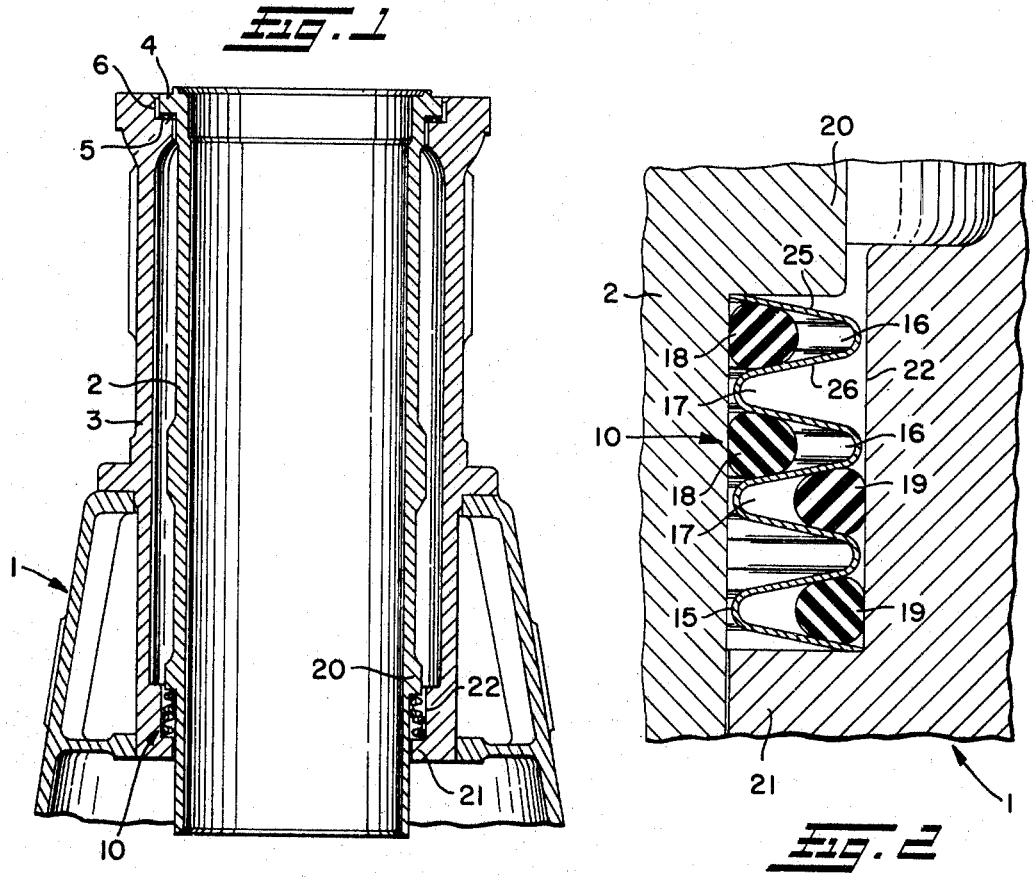
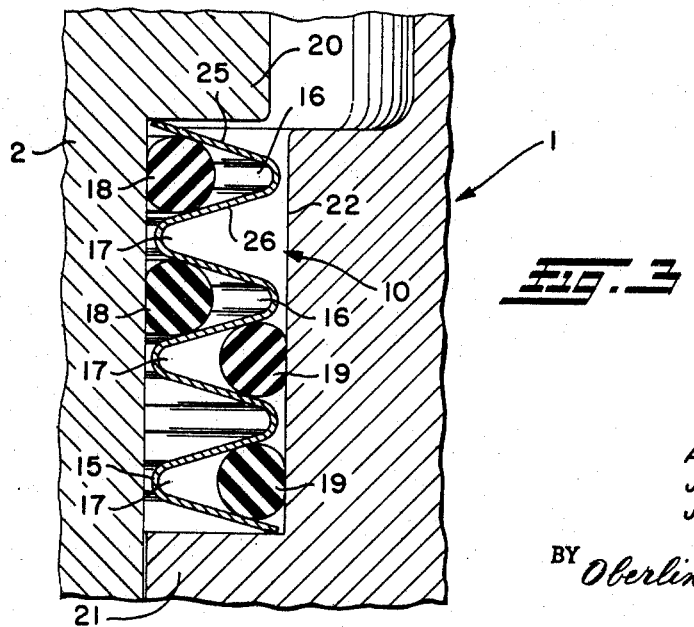
INVENTORS
ALBERT F. KUTAS
JAMES TERRY ALLEN
JERRY G. JELINEK
BY *Oberlin, Maky & Donnelly*
ATTORNEYS

United States Patent Office 3,485,142
Patented Dec. 23, 1969

3,485,142
LINER SEAL FOR DIESEL ENGINES AND THE LIKE
Albert F. Kutas, Westminster, James Terry Allen, Hawthorne, and Jerry G. Jelinek, Whittier, Calif., assignors to Parker-Hannifin Corporation, Cleveland, Ohio, a corporation of Ohio
Filed Jan. 25, 1967, Ser. No. 611,732
Int. Cl. F01b 1/00; F16j 15/48; F16k 41/00
U.S. Cl. 92—169                          17 Claims

ABSTRACT OF THE DISCLOSURE

A liner seal for establishing a fluid-tight joint between cylinder liner and engine block of a diesel engine. Seal consists of an axially deformable bellows having axially spaced annular grooves of generally V-shape which alternately open in opposite directions. Packing rings disposed in selected ones of the grooves are forced into fluid-tight contact with the liner and engine block during axial compression of the bellows. Bellows establishes metal-to-metal seal with radially overlapping shoulders on liner and engine block.

DISCLOSURE

The present invention relates generally as indicated to a liner seal for diesel engines and the like and more particularly to certain improvements in seals for establishing a leak-proof joint between two surfaces such as the cylinder liners of a diesel engine and the surrounding water jacket.

Hitherto it has been the usual practice to seal the lower end of the water jacket for a diesel engine by providing rubber grommets or packing rings between the cylinder liners and engine block contained in grooves in the outer wall of the liners. This particular type of seal has the disadvantage of requiring close tolerance controls, since if the grooves are too large for the packing rings, the seal will not be effective against high fluid pressure, whereas if the grooves are too small, the packing rings may exert too much force on the liners, reducing the liner bores and causing seizing of the pistons. In either case, the pressure of the cooling water may extrude the packing rings between the liners and engine block, causing severe damage to or destruction of the packing rings.

It is accordingly a principal object of this invention to provide a novel liner seal which is adapted to establish the desired leak-proof joint between the cylinder liners and engine block despite wide tolerance variations in the various parts thereof. In general, this is accomplished by constructing the seal in the form of cylindrical bellows of spring steel having oppositely directed grooves in which there are received packing rings for establishing fluid-tight engagement with the adjacent surfaces of the liners and engine block. During assembly, the bellows is placed under compression, thereby forcing the inner and outer packing rings into more intimate contact with the liners and engine block, respectively, while providing additional space to receive the excess rubber of the packing rings so as to avoid extrusion thereof.

Another object is to provide such a liner or other type seal which has increased sealing capabilities with increased pressure.

A further object is to provide such a seal which permits vibration movement of the cylinder liners with respect to the engine block without disturbing the seal.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

In such annexed drawing:

FIG. 1 is a fragmentary longitudinal section through a cylinder liner and engine block with a preferred form of seal constructed in accordance with this invention inserted between the lower end of the cylinder liner and adjacent surface of the water jacket which surrounds the liner;

FIG. 2 is an enlarged section of that portion of the liner and engine block of FIG. 1 between which the seal is disposed; and FIG. 3 is a fragmentary section similar to FIG. 2, but showing the disposition of the seal prior to complete draw-down of the cylinder head bolts.

Referring now in detail to the drawing and first especially to FIG. 1, there is shown a fragmentary portion of an engine block 1 for a diesel engine of conventional type in which there is contained a cylinder liner 2 having a cooling water jacket 3 surrounding the same. The upper end of the cylinder liner 2 may be provided with an outturned flange 4 which is adapted to be brought into sealing engagement with a head gasket 5 located in a counterbore 6 in the engine block 1 upon tightening of the cylinder head (not shown) through drawdown of the cylinder head bolts. A further seal 10 is provided between the lower end of the cylinder liner 2 and adjacent surface of the engine block 1 to preclude leakage of coolant from the water jacket 3.

As previously indicated, this latter seal usually consisted of two or more packing rings disposed in grooves cut in the outer wall of the cylinder liner which of necessity required very close tolerances in the size of the grooves and packing rings to establish the desired seal without unduly distorting the liner. Even then, there was always the danger of extruding the packing rings between the liner and engine block, causing severe damage to or even destruction of the packing rings. With the present invention, on the other hand, these drawbacks are substantially eliminated by providing a seal 10 in the form of a cylindrical bellows 15 of spring steel or other such spring material having two or more axially spaced annular grooves 16, 17 of generally V-shape which open alternately in opposite directions with packing rings 18, 19 respectively received in selected ones of the grooves. However, it should be understood that only one such groove could be provided without departing from the scope of the present invention.

In FIG. 3, the seal 10 is shown in its uncompressed condition surrounding the lower end of the cylinder liner 2 and located between radially overlapping shoulders 20 and 21 of the liner 2 and engine block 1, respectively. As apparent, there is sufficient radial clearance between the opposed surfaces of the liner 2 and engine block 1 for ready receipt of the bellows 15 therebetween without interference with such surfaces. The inner diameter of the packing rings 18 which are contained in the inwardly opening grooves 16, however, is slightly less than the outer diameter of the liner 2 and the outer diameter of the packing rings 19 which are contained within the outwardly opening grooves 17 is slightly greater than the diameter of the counterbore 22 in the engine block 1 in which the seal is received, whereby when the seal 10 is located in the FIG. 3 position, the inner and outer packing rings 18 and 19 are slightly deformed to provide initial sealing engagement with the liner 2 and engine block 1, respectively. This initial sealing engagement is further enhanced by the spring action of the bellows 15 which resists such deformation of the packing rings 18 and 19.

Now, as the cylinder head bolts, not shown, are tightened to force the liner flange 4 into firm sealing engagement with the heat gasket 5, the bellows 15 is compressed to the FIG. 2 condition, thereby reducing the spacing between the walls 25, 26 of the grooves 16, 17 and forcing the inner packing rings 18 into more intimate contact with the outer surface of the cylinder liner 2 and the outer packing rings 19 into more intimate contact with the surface of the counterbore 22. Thus, it can now be seen that the V-shape of the bellows grooves 16, 17 provides a simple and effective means for forcing the packing rings 18, 19 radially into tight sealing engagement with their cooperating surfaces as vertical compression of the bellows 15 is increased; the higher the compressive force, the greater the sealing engagement. Moreover, the bottoms of the V-shape grooves 16, 17 provide sufficient space to receive the excess material of the packing rings 18, 19 as they are deformed under high pressure, thereby avoiding extrusion of the packing rings between the bellows 15 and adjacent wall surfaces. Accordingly, it is not essential that the tolerances of the various parts of the seal 10 be very accurately controlled.

In addition to the tight seal that is established by the packing rings 18, 19, a metal-to-metal seal is formed between the opposite ends of the bellows 15 and the shoulders 20, 21 engaged thereby. As shown, the ends of the bellows 15 are desirably cut to provide right angled edges which fit snugly in the corners formed by the shoulders 20, 21 when the bellows has been compressed to the FIG. 2 position, thus further enhancing the effectiveness of the seal. Metal plating on the bellows also assists in preventing leakage. Moreover, the spring action of the bellows 15 permits the vibration movement of the cylinder liner 2 with respect to the block 1 while preventing extrusion of the packing rings 18, 19.

The packing rings 18, 19 perform another important function. When the seal 10 is initially inserted into the counterbore 22, the outer packing rings 19 accurately concentrically locate the seal 10 therewithin for ready receipt of the liner 2, and the inner packing rings 18 protect the liner 2 from engagement by the metal bellows 15 which could score or groove the liner and cause later water leakage. Accordingly, the care required to assemble the liner 2 using the seal 10 of the present invention is less than when the usual liner seals are used.

Although excellent results have been obtained with a seal 10 having two inner packing rings 18 and two outer packing rings 19 axially spaced from each other as shown, it should be understood that more or less such packing rings could be used if desired, so long as there is at least one inner packing ring 18 disposed in an inwardly opening groove 16 for establishing a fluid seal with the liner 2 and one outer packing ring 19 disposed in an outwardly opening groove 17 for establishing a fluid seal with the engine block 1. In any case, increased pressure acting on the bellows 15 which may be caused both by a tightening of the cylinder head bolts and an increase in the pressure of the cooling fluid within the water jacket 3 results in a corresponding increase in the packing seal of the rings 18, 19 and the metal seal of the bellows 15.

We, therefore, particularly point out and distinctly claim as our invention:

1. In combination, an engine block having a water jacket surrounding a cylinder liner and a seal disposed between said cylinder liner and engine block for precluding leakage of water therefrom, said seal comprising an axially resiliently deformable bellows having axially spaced annular grooves therein which open alternately in opposite radial directions, said bellows being received within an annular space between said liner and the wall of an opening in said engine block without interference with the surfaces thereof, an inner packing ring disposed in an inwardly opening groove in said bellows having an inner diameter slightly less than the outer diameter of said liner for establishing fluid-tight contact with said liner, an outer packing ring disposed in an outwardly opening groove in said bellows having an outer diameter slightly greater than the diameter of such engine block opening for establishing fluid-tight contact with the wall thereof, and means for axially compressing said bellows to deform said inner and outer packing rings radially into tighter sealing engagement with said cylinder liner and engine block, respectively.

2. The combination of claim 1 wherein said grooves are generally V-shape to provide space for receipt of the deformed material of said packing rings during compression of said bellows.

3. The combination of claim 1 wherein said liner and engine block are provided with axially spaced radially overlapping shoulders between which said bellows is compressed.

4. The combination of claim 3 wherein the opposite ends of said bellows engage said shoulders to provide additional sealing contact of said seal with said liner and engine block.

5. The combination of claim 1 wherein there are three such inwardly opening grooves and three such outwardly opening grooves, with inner packing rings only in the first two inwardly opening grooves and other packing rings only in the last two outwardly opening grooves.

6. A seal for establishing a fluid-tight joint between spaced surfaces comprising an axially resiliently deformable cylindrical bellows adapted to be inserted between such surfaces without interference therewith, said cylindrical bellows having axially spaced annular grooves therein which alternately open in opposite radial directions, an inner packing ring received in an inwardly opening groove of said bellows and having an inner diameter slightly less than the innermost diameter of said bellows for engagement with one surface, and an outer packing ring received in an outwardly opening groove of said bellows and having an outer diameter slightly greater than the outermost diameter of said bellows for engagement with the other surface, said grooves being of substantially V-shape to provide sufficient space for receipt of the material of said packing rings when deformed through compression of said bellows.

7. The seal of claim 6 wherein the diameters of said packing rings are such that said packing rings engage the sides of the respective grooves of said bellows with no axial load applied, whereby slight compression of said bellows forces said packing rings in a radial direction away from the bottom of said grooves.

8. The seal of claim 7 wherein said bellows is made of spring steel.

9. The seal of claim 6 wherein there are a plurality of radially inwardly and outwardly opening grooves in said bellows containing said inner and outer packing rings, respectively.

10. The seal of claim 6 wherein there are three such inwardly opening grooves and three such outwardly opening grooves with inner packing rings only in the first two inwardly opening grooves and outer packing rings only in the last two outwardly opening grooves.

11. A fluid seal comprising an axially resiliently compressible bellows having an annular V-shaped groove formed therein, and a deformable packing ring contained in said groove with sufficient space between said packing ring and the bottom of said groove to receive the deformed material of said packing ring during compression of said bellows.

12. The seal of claim 11 wherein said bellows has a plurality of said annular V-shaped grooves with said packing rings contained therein.

13. The seal of claim 11 wherein said grooves alternately open inwardly and outwardly for permitting said packing rings contained therein to establish a fluid seal with two spaced apart surfaces, said packing rings contained in the inwardly opening grooves having an inner diameter slightly less than the innermost diameter of said bellows for engagement with one surface, and said packing rings contained in the outwardly opening grooves having an outer diameter slightly greater than the outermost diameter of said bellows for engagement with the other surface.

14. The seal of claim 13 wherein the ends of said bellows are cut to provide right angled edges which are adapted to fit snugly in right angled corners on such surfaces when said bellows has been compressed to provide additional fluid seals.

15. In combination, a pair of concentric annular surfaces having an annular space therebetween, and a seal between said surfaces comprising an axially resiliently deformable bellows having axially spaced annular grooves therein which open alternatively in opposite radial directions, said bellows being received within said annular space without interference with said surfaces, an inner packing ring disposed in an inwardly opening groove in said bellows having an inner diameter slightly less than the diameter of one of said surfaces for establishing fluid-tight contact therewith, an outer packing ring disposed in an outwardly opening groove in said bellows having an outer diameter slightly greater than the diameter of the other surface for establishing fluid-tight contact therewith, and means for axially compressing said bellows to deform said inner and outer packing rings radially into tighter sealing engagement with said surfaces.

16. The combination of claim 15 wherein said grooves are generally V-shaped to provide space for receipt of the deformed material of said packing rings during compression of said bellows.

17. The combination of claim 15 wherein said surfaces are provided with axially spaced radially overlapping shoulders between which said bellows is compressed, the ends of said bellows being cut to provide right angled edges which are adapted to fit snugly in right angled corners of said shoulders to provide additional sealing contact of said seal with said surface.

References Cited

UNITED STATES PATENTS

| | | | |
|---|---|---|---|
| 765,740 | 7/1904 | Kollermeyer | 277—124 |
| 1,213,340 | 1/1917 | Davis | 123—41.84 |
| 1,301,254 | 4/1919 | Nelson | 123—41.84 |
| 1,368,522 | 2/1921 | Newcomb | 123—41.84 |
| 1,665,192 | 4/1928 | Spence | 123—41.84 |
| 1,734,040 | 11/1929 | McEvoy | 277—124 XR |
| 3,331,609 | 7/1967 | Moran | 277—123 XR |

FOREIGN PATENTS

| | | |
|---|---|---|
| 428,782 | 5/1935 | Great Britain. |
| 627,912 | 3/1936 | Germany. |

LAVERNE D. GEIGER, Primary Examiner

JEFFREY S. MEDNICK, Assistant Examiner

U.S. Cl. X.R.

277—58, 63, 78, 124, 125, 143, 160, 169